United States Patent [19]

Gibson et al.

[11] Patent Number: 4,479,363
[45] Date of Patent: Oct. 30, 1984

[54] FREEZING A LIQUID

[75] Inventors: Peter H. Gibson, Inkberrow; Robert I. Taylor, Guildford, both of England

[73] Assignee: The BOC Group plc, London, England

[21] Appl. No.: 465,417

[22] Filed: Feb. 10, 1983

[51] Int. Cl.³ .............................................. F25D 13/06
[52] U.S. Cl. .......................................... 62/63; 62/67; 62/68; 62/340; 62/381
[58] Field of Search ................. 62/63, 64, 48, 55, 340, 62/66, 67, 68, 381

[56] References Cited

U.S. PATENT DOCUMENTS

| | | | |
|---|---|---|---|
| 2,297,371 | 9/1942 | Siedle | 62/67 |
| 3,162,019 | 12/1964 | Porter et al. | 62/67 |
| 3,730,201 | 5/1973 | Lefever | 62/55 |
| 3,857,974 | 12/1974 | Aref et al. | 62/64 |
| 4,300,355 | 11/1981 | McWhorter et al. | 62/48 |

Primary Examiner—Ronald C. Capossela
Attorney, Agent, or Firm—David L. Rae; Larry R. Cassett

[57] ABSTRACT

In a method of freezing a liquid such as cream, a continuous, pulsating stream of liquid is dispensed from nozzles onto a stream of liquified gas flowing along downwardly inclined channels provided by a trough. The liquid forms itself into discrete spheroidal bodies, a substantial number of which have a larger cross-sectional area than that defined by the outlet of each nozzle from which they are dispensed. The bodies are carried by the liquified gas along the channels and at least their peripheries are frozen by the time the bodies reach the downstream end of the channels. Freezing may be completed by gas cooling. The bodies are then separated from the liquified gas.

20 Claims, 10 Drawing Figures

FREEZING A LIQUID

This invention relates to freezing a liquid. The term 'liquid' is used throughout this specification and the claims to encompass emulsions; suspensions; solutions; the liquid phase of substances that are solid at ambient temperature but which melt at temperatures not greatly in excess of ambient; pastes; semi-liquid foods such as cream, yoghurt, cottage cheese and butter; purees; egg albumen; mixtures of albumen and yolk, whole blood; blood bodies; and serums of drugs. It is essential that the liquid has a viscosity which is not so great that it is not able to be pumped or otherwise passed through a dispensing nozzle or orifice.

The invention is particularly concerned with the freezing of liquids that tend to deteriorate, e.g. by virtue of chemical or bacteriological action, if stored, typically for prolonged periods of time, at ambient temperatures. An example of such a liquid is a dairy product such as cream. Much cream is produced on farms or production centres remote from the eventual consumers. Difficulty can therefore arise in keeping the cream fresh while it is being distributed from a place of production to a place of sale. A particularly efficient distribution system is required, and in general, cream has traditionally not been transported over large distances before sale at a retail outlet. It has therefore been proposed to freeze the cream and store the frozen cream in a refrigerator before sale. This has made possible the export of cream from one country to another. For example, it is known to freeze cream in slabs, break the slabs into lumps of more manageable size, package the lumps in the Republic of Ireland and export the resultant product to England.

One disadvantage of such commercially practical cream freezing technology is that after being thawed the cream is not of such high quality as traditional fresh cream. For example, if the cream after being thawed is added to a hot drink (e.g. coffee) it tends to break down and leave an oily or fatty layer on the surface of the drink. This has led us to look for new methods of freezing liquids.

U.K. Patent Specification No. 1,264,439 relates to a frozen foods substance comprising free-flowing discrete particles of egg or semiliquid dairy product (e.g. cream) wherein each said particle is of pop-corn-like form. The substance is produced by causing the egg substance or semi-liquid dairy product to fall into direct contact with a non-toxic, liquefied gas refrigerant having a temperature below $-150°$ C. and a turbulent surface. The substance sinks and the frozen substance is collected after sinking and is stored in a frozen condition. The liquefied gas is liquid nitrogen.

The process described in U.K. Patent Specification No. 1,264,439 suffers, we believe, from two disadvantages. First, a product of pop-corn-like form is readily crushed owing to its hollow thin-walled structure and there is a tendency for unacceptably large quantities of dust to be produced while the product is being transported to a shop. Second, the process makes poor use of the refrigeration available from a liquefied gas such as liquid nitrogen. The reason for this shall be explained below.

Another process of interest is described in U.K. Patent Specification No. 1,376,972. The process it describes is limited to the production of a frozen food substance from eggs. The egg is caused to fall from at least one nozzle into direct contact with a non-toxic, liquefied gas (for example liquid nitrogen) at a temperature below $-150°$ F. The flow rate of egg from the or each nozzle is from 1 to 5 lbs per hour so that the egg enters the liquefied gas from above its surface as discrete globules which are frozen therein to form pellets with the size range 3 mm to 7 mm. The pellets are collected at the bottom of the vessel containing the liquefied gas and removed therefrom. The pellets are then stored in a suitable freezer.

In that pellets, as distinct from a pop-corn-like product, are produced the process described in U.K. Patent Specification No. 1,376,972 overcomes the first disadvantage associated with the production of frozen egg in the process described in U.K. Patent Specification No. 1,264,439. However, so far as overcoming the second disadvantage is concerned, the process described in U.K. Patent Specification No. 1,376,972 offers no improvement over that described in U.K. Patent Specification No. 1,264,439.

As described in our U.K. Patent Application No. 2,092,880 (in the name of the assignees of this application) the reason for the poor utilisation of liquid nitrogen in the processes described in the aforementioned U.K. patent specifications is that as the pellets sink, (the frozen cream having a greater specific gravity than liquid nitrogen) so there is a rapid fall in their temperature of from about $-10°$ or $-20°$ C. to well below $-100°$ C. Accordingly, our U.K. Patent Application No. 2,092,880 provides a method of producing frozen pellets for liquid, which method comprises the steps of causing drops of liquid to fall onto or into a volume of non-toxic liquefied gas having a boiling point below $-30°$ C.; allowing the drops to freeze to form buoyant pellets of frozen liquid and separating such pellets from the liquefied gas before they loose their buoyancy. Typically, a flow of liquefied gas is established and the droplets allowed to fall onto the surface of the liquefied gas and then be carried by the liquefied gas to a separator where they are separated from the liquefied gas, the residence time of the pellets in contact with the liquid nitrogen being insufficient for them to loose their buoyancy.

We have now discovered that for a liquid having a given viscosity there is a maximum size to the pellets or solid bodies of frozen liquid that can be produced by this method. This is because evaporated liquefied gas (typically nitrogen) forms a gas cushion under each droplet and counteracts the force of gravity. Consequently, surface tension forces exerted by the liquefied gas tend to pull the drops apart such that there is a limitation on the maximum size of drop that will remain stable on the surface of the liquid nitrogen. Moreover, there is a limit on the quantity of frozen pellets that can be formed per unit time per nozzle from which the droplets are dispensed. For example, we have found that the maximum rate of production of frozen double cream pellets is in the order of 10 cm$^3$ per nozzle per minute. It is desirable in commercial practice greatly to exceed such production rates without having recourse to a freezer with tens of dispensing nozzles.

It is an object of the present invention to provide a method and apparatus for producing generally spherical or spheroidal bodies of frozen liquid which makes it possible to overcome or mitigate (at least in the example of cream) the limitations mentioned in connection with our aforesaid U.K. Patent Application No. 2,092,880.

Other objects of the present invention will become apparent from the ensuing description of exemplary embodiments and the novel features will be pointed out in conjunction with the claims appended hereto.

According to the present invention there is provided a process for freezing a liquid to form generally spherical (or generally spheroid) frozen bodies of liquid, comprising passing the liquid to be frozen through at least one orifice and causing a pulsating and substantially continuous flow of the liquid to pass into or onto a stream of liquefied gas, having a boiling point below −30° C., flowing along a channel, the rate of passage of the liquid through the orifice being sufficiently large for a proportion of the liquid to form into discrete bodies of greater cross-section area than the orifice; maintaining the bodies in contact with the liquefied gas for a time sufficient for at least their peripheries to freeze, and collecting the resulting generally spherical or generally spheroid frozen bodies of liquid.

The invention also provides apparatus for freezing a liquid comprising means defining at least one orifice; at least one channel, the orifice defining means being adapted to be positioned above the channel to dispense the liquid to be frozen into the channel; means for creating a stream of liquefied gas along the channel, the liquefied gas having a boiling point of less than minus 30° C., means for passing the liquid to be frozen through the orifice and for creating a pulsating and substantially continuous flow of the liquid into or onto the stream, and means for collecting frozen bodies of the liquid from the apparatus, whereby, in operation, the liquid can form itself into discrete, generally spherical or generally spheroid bodies at least some of which are of greater cross-sectional area than the orifice and the bodies can be maintained in contact with the liquefied gas for a time sufficient for at least their peripheries to freeze.

Preferably, the said channel has a downwardly sloping bottom along which the larger bodies are able to be rolled by the liquefied gas. The slope is desirably relatively gentle, i.e. in the range 1 in 10 to 1 in 60.

The liquefied gas is desirably non-toxic, and need not have a greater specific gravity than the liquid to be frozen. Indeed, we prefer to use liquid nitrogen as the liquefied gas. Even if the liquid to be frozen has a greater specific gravity than liquid nitrogen (as it typically may), gas bubbles collecting on the underside of the liquid initially coming into contact with the liquid nitrogen will tend to cause the liquid initially to float on the surface of the stream of liquid nitrogen.

The orifice is typically defined by a nozzle. The diameter of the orifice may be selected in accordance with the viscosity of the liquid to be frozen.

In general, the preferred orifice diameter tends to increase with increasing viscosity. For producing frozen double or whipping cream we have used orifices having a diameter in the range of 1 to 3 mm.

The liquid to be frozen is preferably passed through the orifice by means of a positive-displacement pump. Such a pump is naturally able to provide a continuous, pulsating flow of the liquid to be frozen. It is, however, possible to use a pump that provides a steady or non-pulsating flow of the liquid and provide a reciprocating or other member that temporarily interrupts or constricts the flow downstream of the orifice at a chosen frequency so as to give a pulsating and substantially continuous flow. Various kinds of positive-displacement pump may be employed in the method and apparatus according to the invention. For example reciprocating piston pumps, diaphragm pumps or lobe pumps may be used. We believe that the more pronounced the pulsations, that is the greater the difference in amplitude between the maximum and minimum widths of the pulsating liquid issuing from the orifice, the more the formation of relatively large bodies of the liquid is facilitated. Further, the formation of relatively large generally spherical or generally spheroid bodies of the liquid tends, we find, to be generally accompanied by a greater rate of production of frozen liquid than when substantially all the cream is formed in bodies or particles having a cross-sectional area less than or approximately the same as that of the orifice. In order to produce a suitably pulsating flow of the liquid to be frozen we prefer to use a peristaltic pump. Such a pump also offers the advantage of facilitating hygenic handling of liquid or semi-liquid foodstuffs such as cream as there is no direct contact between the moving parts of the pump and the cream.

In use, the nozzle is preferably positioned in relation to the stream of liquefied gas so as to avoid creation of excessive turbulence, that is such turbulence as would inhibit the formation of generally spherical or generally spheroidal bodies of the liquid to be frozen.

Accordingly, in use, the outlet orifice of the nozzle is preferably just (e.g. up to 1 cm) above the surface of the stream of liquefied gas and faces generally towards rather than generally in the opposite direction to the direction of flow of the liquefied gas, the axis of the nozzle typically making an angle of from 10° to 60° with the stream of liquefied gas. Alternatively, the outlet of the nozzle may be positioned underneath the surface of the liquefied gas, although this alternative is not preferred. In order to avoid creating excessive turbulence, it is desirable to provide a substantially laminar flow of liquefied gas along the channel.

It is preferred that the depth of liquefied gas in the channel is maintained in the range 0.5 to 1.5 times (and most preferably 0.6 to 1.2 times) the maximum diameter (e.g. the diameter along the major axis in the case of a spheroid) of the largest spherical or spheroid bodies that are produced. (For example, the depth may be in the order of 1 cm). It is then found that the larger size bodies are rolled along the bottom of the channel by the liquefied gas. The bottom of the channel is preferably shaped so as to facilitate such a rolling action.

The flow rate of the liquid through the orifice is selected in accordance with the invention so as to give relatively large bodies of frozen liquid, i.e. generally spherical or generally spheroid bodies having a diameter (along the major axis in the case of spheroid particles) substantially greater than that of the orifice (which is typically circular). When using a peristaltic pump to pass double cream continuously through a suitably disposed nozzle having an outlet orifice of a diameter in the range 2 to 3 mm onto the surface of a stream of liquid nitrogen having a depth in the order of 0.5 to 1 cm and flowing along a gently inclined channel, we found there were three distinct phases of operation dependent upon the flow rate of the cream. At the lowest flow rates substantially no frozen spherical or spheroid bodies of cream having a diameter (along the major axis in the case of spheroid particles) greater than that of the orifice were formed. In an intermediate range of flowrates we found that the cream did not break up on the surface of the liquid nitrogen to form spherical or spheroid bodies. Surprisingly, however, we found that on increasing the flow rate of cream through the nozzle we found that we could again form generally spheroid bodies of frozen cream but this time with a substantial proportion of the bodies having a diameter (along the major axis) of from 0.6 to 0.8 mm. Typically, such bodies can be produced with a cream flow rate in the order of 200 cm$^3$ per nozzle per minute depending on nozzle size, the speed of the liquid nitrogen and viscosity of the cream among other parameters. Thus, the flow rate of the liquid required in accordance with the invention may be determined by simple experiment.

We also find that when relatively large spheres or spheroids of frozen cream are formed in accordance with the invention, smaller bodies are formed as well. This is not disadvantageous as a range of sizes facilitates the achievement of a high packing density when packaging frozen cream produced by the method accordingly to the invention.

Preferably the speed at which the liquid nitrogen flows along the channel, and the length of the channel are selected so as to avoid freezing the entire mass of the larger bodies of liquid that are formed. The downstream end of the channel is therefore preferably positioned above the inlet of a separator which separates the frozen bodies from the liquefied gas but which allows a sufficient duration of contact between the liquefied gas and/or its cold vapour and the bodies to complete their freezing. Typically, in the separator, the bodies are passed to an outlet in a direction generally opposite to that followed by the liquefied gas as it flows along the channel. The separator can thus be positioned generally below the channel thereby enabling the apparatus according to the invention to be accomodated in a relatively compact housing. Typically, the residence time of the liquid in the channel may be selected to be in the order of 3 to 15 seconds provided that at least the peripheries of the bodies of the liquid are frozen. Typically, the or each channel may be from one to two meters long and the velocity of the liquefied gas in the range of 0.14 to 0.66 meters per second (for double cream we have employed velocities in the range of 0.2 to 0.4 meters per second). A suitably liquefied gas flow velocity may be found by simple experiment for a given depth of liquefied gas and given rate of dispensing the liquid to be frozen, amongst other parameters. We have found that the depth of the liquefied gas in the (or each) channel is an important parameter being interrelated with liquefied gas flow velocity and the rate at which the liquid to be frozen is dispensed. Thus, with all other parameters constant, if liquefied gas in the channel is too shallow there will be a build up of liquid to be frozen at the upstream end with consequential formation of relatively long strands or elongate bodies of frozen or partially frozen liquid rather than spherical or spheroid bodies at the upstream end, whereas if the liquefied gas in the channel is to deep a build-up tends to occur at the downstream end as the bodies enter the separator (particularly the preferred kind of separator described hereinabove) with eventual formation of relatively long bodies of frozen cream. Moreover, it is not always possible to make a complete adjustment for excessive depth by decreasing the speed of flow of the liquefied gas as this may result in separate spherical or spheroid bodies of cream agglomerating as the liquefied gas flow along the channel. In general, however, we believe it is possible to operate the apparatus according to the invention satisfactorily if the aforementioned relationship between the depth and the diameter of the largest spherical or spheroid bodies is adhered to.

The separator preferably comprises a perforate rotary drum which in operation permits liquefied gas to fall under gravity into a sump and which is inclined with its inlet end uppermost so as to pass the bodies of liquid to a rotating screw which urges said bodies towards an outlet where they can be collected. The rotating screw preferably urges the bodies up an inclinedsurface in contact with cold vapour evaporating from the liquefied gas. This arrangement facilitates substantially complete freezing of the spherical or spheroid bodies.

The liquefied gas separated from the said bodies is typically collected in a sump and returned to a reservoir which feeds the or each channel by means of a lift pump (for example in Archimedean screw or arrangement of buckets that are moved along a path extending from the sump to the reservoir, the arrangement being such that the buckets scoop liquefied gas from the sump and deposit it in the reservoir).

It is not necessary for the separation of the liquefied gas from the partially or entirely frozen bodies of liquid to be perfect. Indeed, it is sometimes preferred for the perforations or other apertures in the drum to be of a size sufficient for the smallets particles of bodies of frozen liquid to pass therethrough. For example, in the freezing of cream, we prefer to make the apertures of a size that allows particles whose largest dimensions is 1 mm or less to pass therethrough and be collected in the sump with the liquefied gas. Thus, such particles are returned to the channels, and in practice a proportion of them agglomerate with larger bodies of cream to form even larger bodies.

If the viscosity of the liquid to be frozen varies significantly with temperature it may be desirable to control the temperature at which the liquid is taken by the pump or other means used to pass it through the orifice. Generally, it is preferred to choose the temperature at the lower viscosity end of the temperature range. For example, in the freezing of, say, double cream, we prefer to supply the cream to the pump at a chosen temperature in the range of 13° to 25° C., at which temperature its viscosity is significantly less than in the range 1° to 10° C. at which it is typically served.

Before dispensing the liquid to be frozen into or onto the stream of liquefied gas, it is desirable to pre-cool the apparatus by passing liquefied gas through it. It is in particular desirable to maintain the bottom of the or each channel at a temperature not greater than the boiling point of the liquefied gas. If bubbles collect at such surface we find that they tend to hinder the formation of relatively large spherical or spheroid bodies of liquid to be frozen.

Generally, in commercial embodiments of the apparatus according to the invention there will at least three channels extending in parallel with one another, each having its own orifice associated with it.

The method and apparatus according to the present invention will now be described by way of example with reference to the accompanying drawings; in which.

Figure 1:
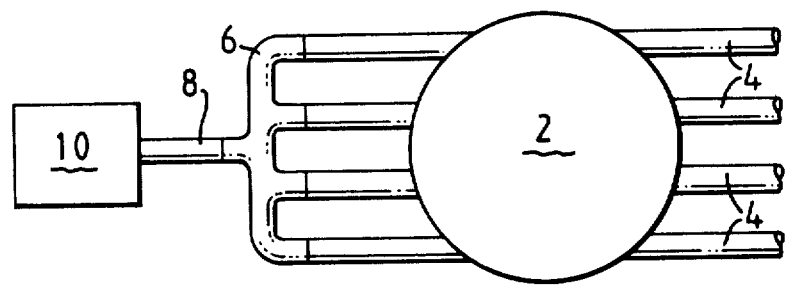
FIG. 1 is a schematic drawing illustrating means for supplying cream to the nozzles of a cream freezer according to the invention.

Referring to FIG. 1 of the drawings, a peristaltic pump 2 employs four flexible tubes 4 which at the inlet ends are connected to a header 6 fitted to the outlet 8 of a Pasteuriser 10, and at the outlet ends are four cream dispensing nozzles 12 associated with the cream freezer shown in more detail in FIGS. 2 to 7 of the accompanying drawings.

Figure 2:
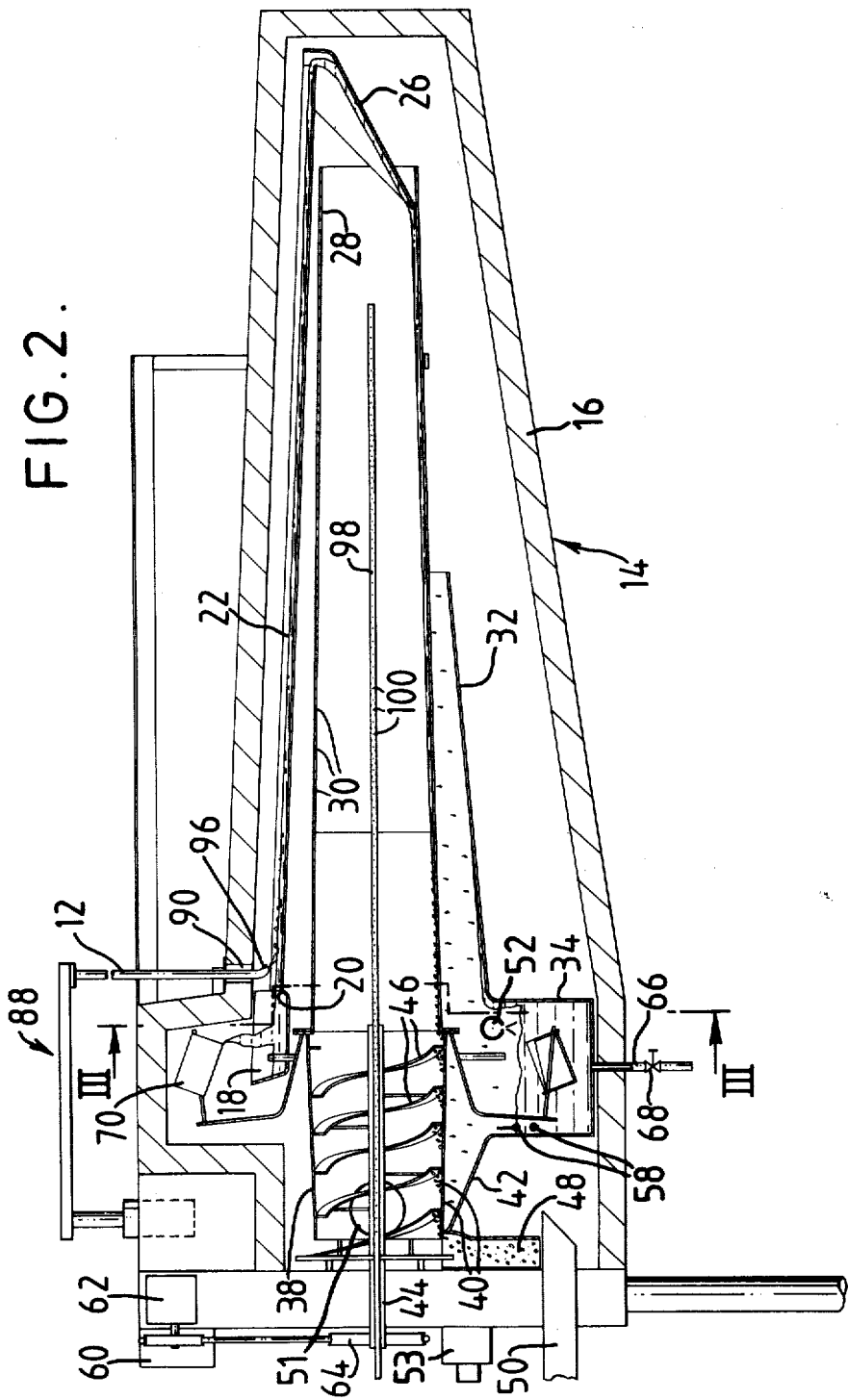
FIG. 2 is a schematic side elevation, partly in section, of a cream freezer according to the invention.

Referring now to FIG. 2, the cream freezer 14 has a thermally-insulated housing 16 through the top of which the nozzles extend in use of the apparatus. Typically, the housing 16 comprises inner and outer skins of stainless steel with a suitable insulant (e.g. Perlite) therebetween. The purpose of the insulation is to reduce the rate at which heat would otherwise be absorbed by the freezer 14.

Situated within the housing 16 towards the left hand end (as shown) thereof is the reservoir 18 having an outlet in a dam or baffle 20 adapted to feed liquid nitrogen to the upstream end of a trough 22 having four channels 24 (FIG. 3) for the flow of liquid nitrogen. (The arrangement of the reservoir 18 and the dam 20 will be described in more detail below with reference to FIG. 6). The channels 24 extend generally parallel to one another and are generally downwardly inclined from their respective upstream ends to downstream ends at the right hand ends (as shown) of the housing 16, the slope being in the order of 1 in 35. Extending from beyond the downstream end of the trough 2 is a guide plate 26 which terminates within and near the inlet of a first rotary drum 28. The guide plate 26 has an upper generally vertical portion extending just above the top of the trough and an integral lower portion sloping downwardly to the drum 28. In operation, liquid nitrogen falling from the downstream end of the trough 22 is guided by the guide plate 26 into the rotary drum 28. The rotary drum 28 is generally of frusto-conical shape with its inlet end being narrower than its outlet end and its longitudinal axis being horizontal. There is thus a gentle slope down which the bodies of cream are able to tumble in operation of the cream freezer. The lower or outlet end of the drum 28 has narrow slots 30 formed through it. In operation, this permits liquid nitrogen to fall under gravity through the slots 30 while partially or fully frozen spherical or spheroidal bodies of cream are retained. This enables the cream to be separated from the liquid nitrogen. Located beneath the slotted end of the drum 28 is a downwardly inclined guide plate 32 which is adapted to collect liquid nitrogen falling through the slots 30 in operation of the apparatus. The guide plate 32 slopes towards a sump 34 adapted to collect the liquid nitrogen.

The outlet end of the rotary drum 28 is joined by means of flanges 36 to a second rotary drum 38 which is formed with narrow slots 40 adapted to separate any residual liquid nitrogen from frozen spherical or spheroid bodies of cream and to permit nitrogen vapour evolved from the sump 34 to pass into the interior of the drum 38. A guide plate 42 slopes downwardly from the outlet end of the drum 38 to the sump 34 so as to collect any such liquid nitrogen in operation of the apparatus and guide it into the sump 34. The drum 38 is of generally frusto-conical shape and is positioned with its lingitudinal axis horizontal. There is thus an outward slope along which the frozen bodies of cream are propelled in operation of the cream freezer. The inlet end (the right hand one as shown in FIG. 2) of the drum 38 is joined by flanges to the outlet end of the drum 28.

Within the drum 38 there extends a shaft 44 to which a screw 46 is attached or formed integral therewith. The screw 46 is adapted to propel frozen spherical or spheroidal bodies of cream in an upward direction along the surface of the drum 38 to an outlet 48 down which such bodies of cream are able to be fed into a collection tray or device 50 which may extend through the insulated housing 16 into the interior of the freezer 14 at a region below the outlet 48.

The sump 34 has located thereabove a spray header 52 connected to a source 59 of liquid nitrogen (typically a vacuum-insulated vessel adapted to supply liquid nitrogen), via a pipe 54 having a flow control valve 56 disposed therein. The sump 34 has upper and lower level sensing elements 58 disposed therein, the arrangement being that the valve 56 opens automatically on the lower of the level sensing elements 58 becoming exposed thus causing liquid nitrogen to be sprayed into the sump 34 and closes again automatically on the upper one being covered. Thus causing the supply of liquid nitrogen to the sump 34 to be discontinued. Typically, to effect this, electrical signals are relayed from the sensing elements 58 to a control box 60 mounted on the drum, which control box 60 is adapted to generate signals in response to the sensors so as to open and close the valve 56. For example, the control box 60 may generate electrical signals and the valve 56 may be a solenoid valve, the electrical signals appropriately energizing and de-energizing the solenoid. By such means, the level in the sump 34 can be kept between chosen minimum and maximum values.

The rotary drums 28 and 38 are driven by means of an electric motor 62. There is a belt-and-pulley drive 64 that transmits the drive from the motor 62 to the rotary drums 28 and 38. The motor is typically mounted to the outside of the housing 16.

At the outlet end of, but within the rotary drum 38 is a gas outlet 51 communicating with a fan 53 located outside the housing 16. Operation of the fan creates a positive flow of nitrogen vapour along the interior of the drums 28 and 38 in the direction of passage of the cream bodies thereby facilitating complete freezing of the cream.

The sump 34 may have at its bottom a drain pipe 66 having a tap 68 therein. The pipe 66 typically extends through the bottom of the housing 16, the tap 68 being located at a position outside the housing 16 so as to permit manual operation.

Figure 3:
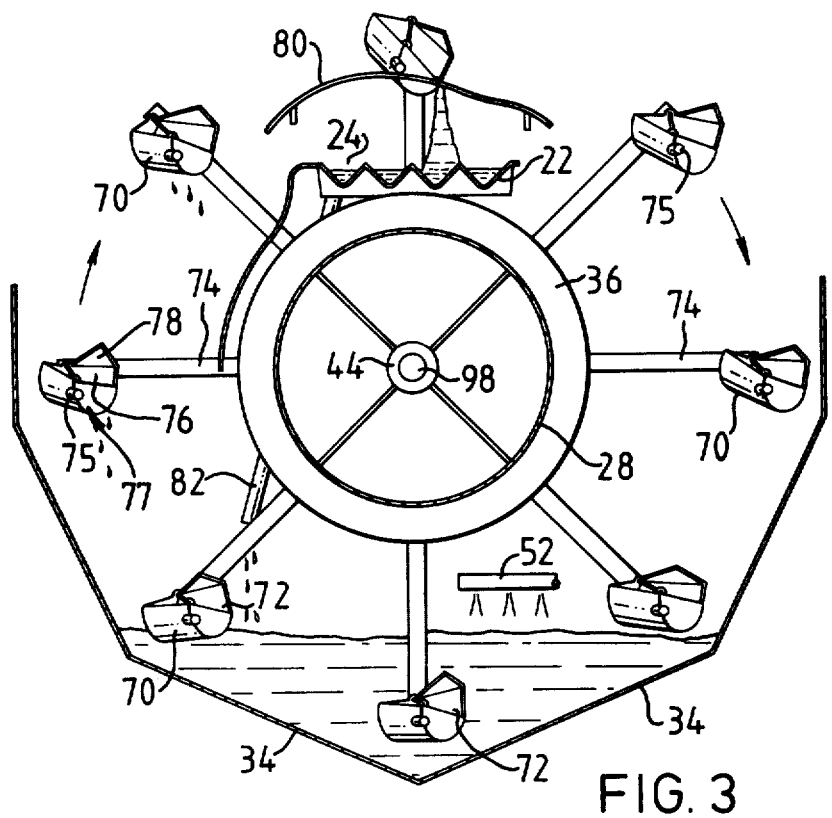
FIG. 3 is a section taken through the line III—III in FIG. 2.
Figure 3A:
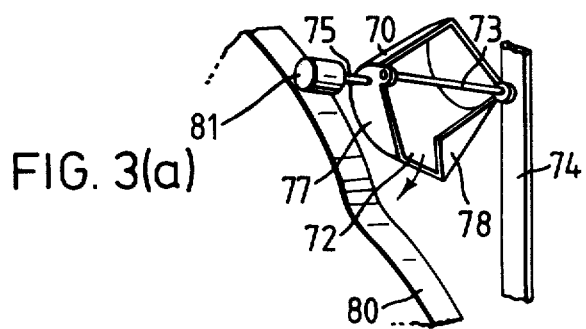
FIG. 3(a) is a perspective view from above and one side of a bucket in a tipped position, the bucket being as shown in FIG. 3.

As shown in FIGS. 2, 3 and 3(a) a lift pump is adapted to transfer liquid nitrogen from the sump 34 to the reservoir 18, the lift pump including eight generally radially disposed and equally spaced apart buckets 70. Each bucket 70 is pivoted to a rod 73 that extends through diagonally opposite corners at the mouth thereof. Each rod 73 extends generally horizontally from an elbow-piece 74 that is welded or otherwise fixed to the flange 36. Each bucket 70 is formed with a relatively low wall portion 72 at one end face 77, such portion 72 being provided at an unpivoted corner and being in part bounded by a side wall 76 having a counterbalancing generally triangular baffle 78 integral therewith, said baffle helping, in operation, to direct the liquid nitrogen through the portion or channel 72 when the bucket is tipped. The pivoting of the buckets 70 is arranged such that, when full of liquid, they do not normally tip to one side or the other spilling liquid nitrogen. In operation, the buckets are rotated along a path which at its lowermost region extends through the sump 34 whereby the buckets are able to scoop up liquid nitrogen from the sump and which at its uppermost region extends over the reservoir 18. In order to effect emptying of the buckets, the end face 77 of each bucket preferably has projecting therefrom an external lug 75 carrying a small cylindrical cam follower 78 which, as the buckets are rotated, is adapted to follow a cam surface 80 (omitted for purposes of clarity of illustration from FIG. 2) at an upper region of the circular path (see FIGS. 3 and 3(a). The cam surface 80 is shaped such that as each bucket 70 travels over the reservoir 18 so a moment is applied to the bucket causing it to pivot about the rod 73 such that liquid nitrogen passes through the channel 72 and falls under gravity into the reservoir 18. If desired, an overflow pipe 82 may be provided in the reservoir 18 and conduct excess liquid nitrogen back to the sump 34. If desired, the overflow pipe 82 may not make a fluid-tight fit of the bottom of the reservoir 18 so as to allow a small trickle of liquid to fall from the reservoir 18 into the sump 34 when the reservoir contains liquid. Such an arrangement facilitates cleaning of the apparatus after use, as water is thereby able to pass directly from the reservoir 18 to the sump 34, thereby allowing the reservoir to drain itself of liquid. This arrangement of the reservoir is shown in more detail in FIG. 6.

Figure 6:
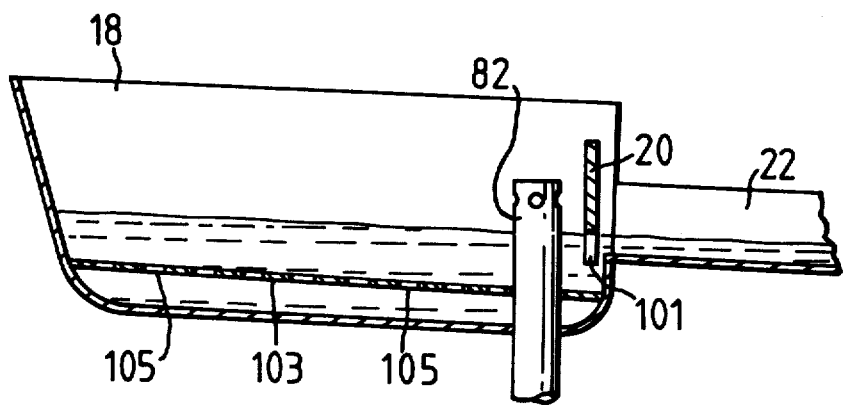
FIG. 6 is a schematic illustrating the reservoir shown in FIGS. 2 and 3.
Figure 6A:
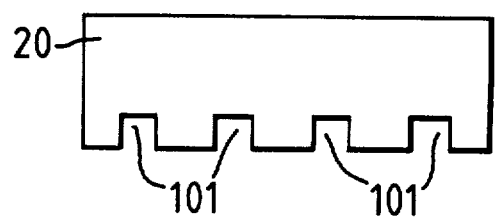
(FIG. 6(a) is side elevation of part of the reservoir shown in FIG. 6).
Figure 7:
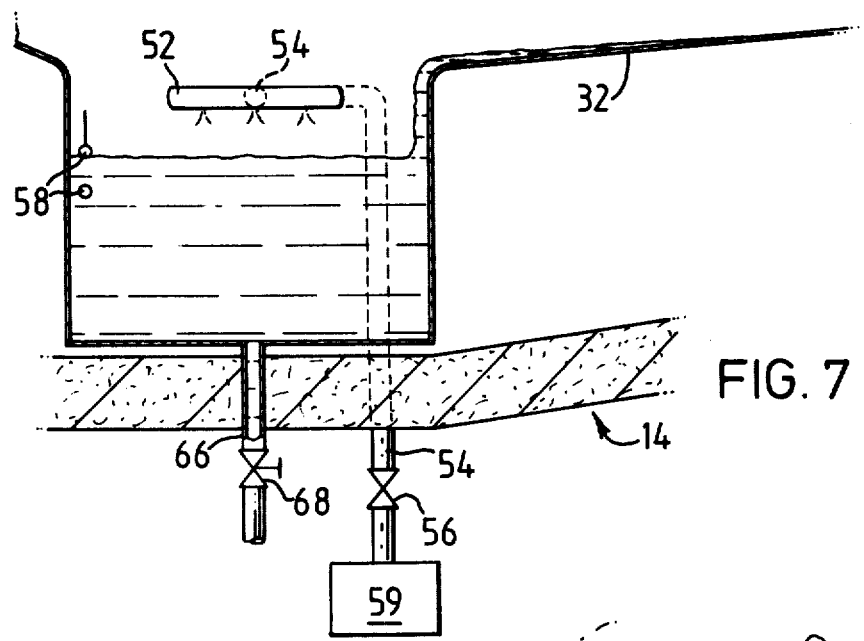
FIG. 7 is a schematic illustrating the sump shown in FIGS. 2 and 3.

As shown in FIG. 6, the floor of the reservoir 18 slopes towards the upstream end of the trough 22. The dam or baffle 20 is a plate which has at its bottom a row of generally rectangular slots 101 formed therein (see FIG. 6(a)). The slots 101 cooperate with the floor of the channels 24 to permit a laminar flow of liquid nitrogen from the reservoir along the channels 24 to take place. The overflow pipe 82 is positioned such that liquid nitrogen cannot, in operation, flow over the top of the dam or baffle 20. The baffle or dam 20 is typically curved presenting in transverse cross-section a generally concave face to the trough 22.

In order to help provide a laminar flow of liquid nitrogen from the reservoir 18 to the trough 22, a perforate plate 103 cooperates with the floor of the reservoir 18. The plate 103 has a multitude of apertures 105, each of a diameter in the order of half an inch, formed therethrough. The plate 103 extends generally parallel to the floor of the reservoir 18 and is typically positioned about 1 cm above the floor. In operation, the plate 103 helps to dampen turbulent flow that might be caused by liquid nitrogen pouring out of the buckets 70 (see FIG. 3) into the reservoir 18.

Figure 4:
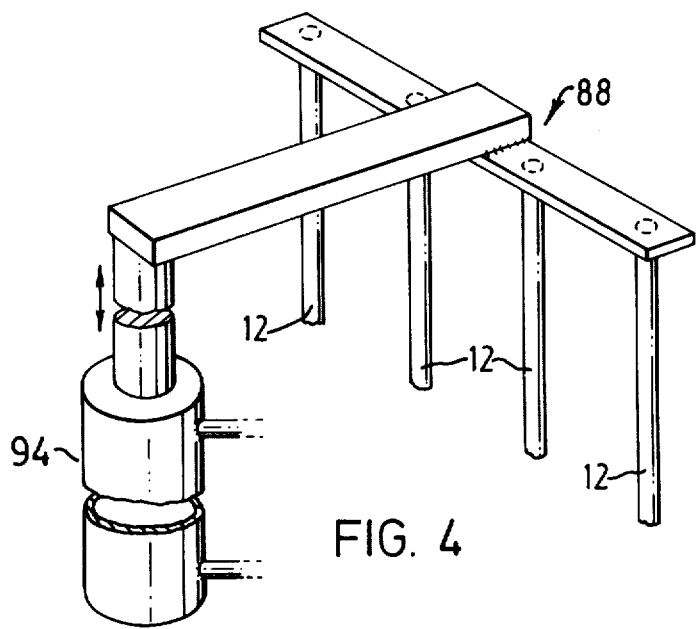
FIG. 4 is a schematic end view of the arrangement of the dispensing nozzles and trough forming part of the cream freezer shown in FIGS. 2 and 3.
Figure 5:
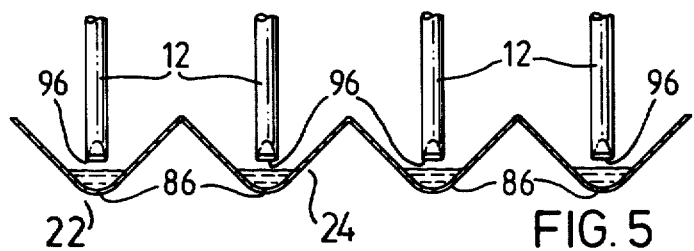
FIG. 5 is a schematic side view of the arrangement of the dispensing nozzles and trough forming part of the cream freezer shown in FIGS. 2 and 3.

Referring now to FIGS. 4 and 5 of the accompanying drawings, the trough 22 has four similar channels 24.

Each channel 24 has a curved bottom portion 86 of generally arcuate cross-section integral with inclined generally rectangular sides making an angle of about 45° with the horizontal. The depth of the arcuate portion 86 of each channel is typically in the order of half a centimeter. The length of its longest chord is typically in the order of 1 centimeter.

The channels 24 are open at their tops so that, in operation, there is an interface between the liquid nitrogen flowing along the channels 24 and the gas space thereabove. The nozzles 12 depend from a support arm 88 passing through a slot 90 in the housing 16 (FIG. 2). The support arm 88 is mounted on an hydraulic or pneumatic cylinder 94 (see FIG. 4) operable to raise and lower the nozzles 12. In their lowermost positions, the nozzles 12 terminate in the respective channels 24 of their outlets 96 about half a centimeter above the level of the liquid nitrogen flowing along the channels 24. The nozzles 12 may, however, be retracted from such position (for example, for cleaning) by operation of the cylinder 94 (which is typically operatively associated with the control box 60, FIG. 2).

The axes of the outlets 96 of the nozzles 12 typically face towards the downstream end of the channels 24 making an angle of approximately 20° with the surface of the liquid nitrogen in the channels. Moreover, the axes of the nozzles at their outlets are desirably coplanar with a perpendicular plane bisecting the respective channels.

A spray tube 98 having spray orifices 100 located along most of its length extends from outside the housing 16 into the interior of the drums 28 and 38 and is connectible to a source of water or other cleaning fluid to enable the drums to be cleaned after use.

The control box 60 typically comprises pneumatic, hydraulic electrical or electronic control circuits of a kind well known in the art of cryogenic engineering to enable the following operations to be completed. By operation of a manual switch or push button (not shown) provided on the control box, the motor 62 is energised so as to start rotation of the drums 2 and the buckets 70 and, the valve 56 is opened to initiate liquid nitrogen supply from the spray header to the sump 34 and hence to the reservoir 18. The fan 53 is simultaneously energised thereby creating a flow of cold nitrogen vapour along the drums 28 and 38 as aforesaid. The liquid nitrogen flows from the reservoir 18 through the dam 20 and along the trough 22. It then flows into the separator falling through the slots in the drum 28. The liquid nitrogen falls through the slots in the drum 28 and collects in the sump 34. The level sensing elements 58 keep the level of liquid nitrogen in the sump 34 between chosen limits by sending signals to the control box 60 to close and open the valve 56 as appropriate. Initially, the apparatus may be at ambient temperature, and thus much of the liquid nitrogen first supplied to the sump 34 and the other parts of the cream freezer 14 will evaporate. Gradually, the rate of evaporation will diminish as the cream freezer cools down. After several minutes of operation, the temperature of the bottom portions 86 of the channels 24 will be lowered to the boiling point of the liquid nitrogen ($-196°$ C.). This may, for example, take 5 minutes. There is thus typically a timer circuit in the control box 60 which a predetermined period after energizing the motor 62 causes the hydraulic cylinder 94 to lower the nozzles 12 into their lowermost positions just above the surface of the liquid nitrogen at the upstream end of the channels 24 and which simultaneously energizes the peristaltic pump 2 to pass cream from the Pasteuriser 10, (FIG. 1) to the nozzles 12.

The peristaltic pump 2 is set to give a relatively high flow rate therethrough. Typically, for nozzles having outlets of 2 to 3 mm in diameter, the flow rate is at least 150 cubic centimeters per nozzle per minute. This is in comparison to a liquid nitrogen flow velocity along the channels 24 in the order of 0.2 to 0.6 meters per second and a liquid nitrogen depth (measured from the bottom of the channels) of 1 centimeter. (The channels are approximately 2 meters long and therefore the liquid nitrogen flow rate is in the order of 1 liter per channel per minute.)

Figure 8:
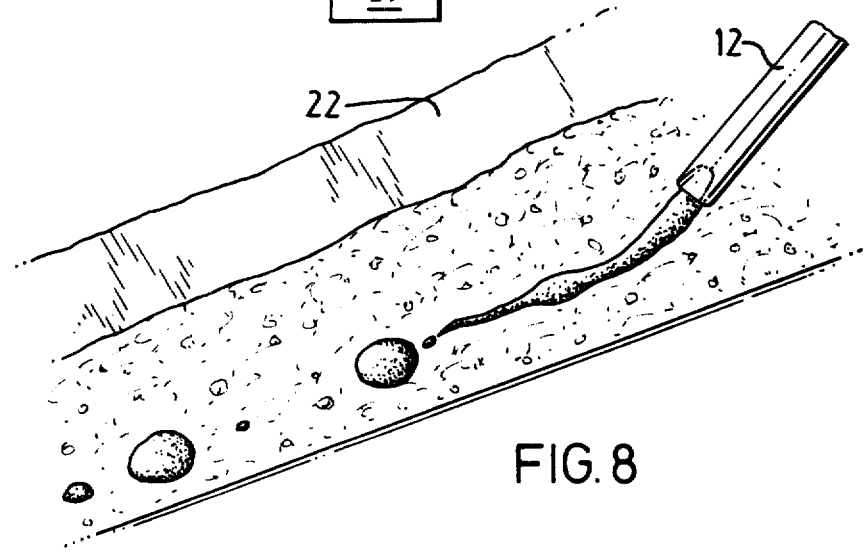
FIG. 8 is a perspective drawing copied from a photograph showing the formation of cream bodies in accordance with the invention.

Referring now to FIG. 8 of the drawings, the cream issues from each nozzle 12 as a continuous and pulsating stream generally circular in cross-section. The pulsation is such that the cross-sectional diameter of the crease at successive minima is appreciably less than the diameter of the outlet 96 of the respective nozzle 12.

The pulsating stream issuing from the nozzle tends to float on the surface of the flowing liquid nitrogen in the channels 24 as a result of gas bubbles collecting underneath the cream. We believe that on the surface of the flowing nitrogen portions of the stream of cream of maximum cross-sectional area advance towards the downstream end of the channels 24 at a different speed from the portions of minimal cross-section. This differential velocity tends to accentuate the difference in cross-section between maxima and minima and results in the formation of a length of cream having a pronounced head of greater cross-sectional area of the respective nozzle outlet 96 and a relatively thin tail adjoining an upstream length of cream in which the accentuation between maximum stream thickness and minimum stream thickness is not so pronounced. The tail then breaks thereby forming a separate head-and-tail length of cream which soon forms itself into a relatively large body that typically is typically of sufficient size to touch the bottom of the respective channel 24 and be rolled therealong by the flow of liquid nitrogen. It may be that the head touching the bottom of the channel happens before the breaking of the tail takes place. It is to be emphasised however that the above description of how the relatively large spheroidal bodies of cream are formed may be a simplification of a complex hydrodynamic process and is in no way intended to limit the scope of the invention. When the tail breaks we also believe that relatively small particles of cream typically having a diameter not greater than 1 mm are formed. These smaller particles float on the surface of the liquid nitrogen and are carried with it towards the downstream end of the channels 24. The bodies that are rolled down the surface of the channels 24 by the liquid nitrogen travel more slowly than those which are carried on the surface of the liquid nitrogen.

The velocity of the flow of the liquid nitrogen along the channels 24 is arranged such that by the time the bodies reach the downstream end of the channels 24, they have had sufficient contact with the liquid nitrogen to be frozen at their peripheries but to remain liquid inside.

Typically, the residence time is chosen to be in the order of 5 to 10 seconds. The partially frozen spheroidal bodies of cream, together with smaller bodies (some of which may be partially frozen) are carried by the stream of liquid nitrogen over the outlet end of the channel 24 onto the guide plate 26 and from there into the rotary drum 28.

It is to be appreciated that once the bodies of cream are separated from the liquid nitrogen cooling does not end. The considerable volume of cold nitrogen vapour is present in the drum 28 as a result of evaporation of the liquid nitrogen, and rotation of the drum 28 causes intimate contact between this cold nitrogen vapour and the bodies of cream. Moreover, operation of the fan 53 causes a flow of nitrogen vapour from the drum 28 into the drum 38 and the gas cooling is continued in the drum 38 as the bodies of cream pass into it from the drum 28. The screw 46 then propels the bodies of cream upwards to the outlet 48 through which they fall under gravity to be collected in the collecting device 50. Any residual liquid nitrogen or small particles of cream fall through the slots 40 under gravity and are collected in the sump 34. Typically, the residence time of the bodies of cream in the part of the freezer 14 intermediate the end of the channels 24 and the outlet 48 is in the order of 10 to 20 seconds. This is generally sufficient to enable even the centres of the largest bodies to be frozen without giving rise to over freezing (i.e. cooling to a temperature below about $-30°$ C., when, there is a tendency for substantially all the largest bodies to crack). It is an advantage of the apparatus according to the invention that it is capable of being operated so as to prevent both undercooling of the cream (exhibited by incomplete freezing of the largest bodies) and over-freezing (exhibited by cracking of substantially all the largest bodies). Typically, some cracking of the largest spheroidal bodies may take palce as these are relatively dimensionally unstable.

The operation of the lift pump returns liquid nitrogen from the sump 34 to reservoir 12 together with the small particles of frozen cream that have been collected therein. The lift pump employing buckets shown in FIGS. 2, 3 and 3($a$) of the accompanying drawings is found to be particularly advantageous as it does not employ any valves and is therefore not prone to valve failure as it is able to cope with particles or small bodies of frozen cream and as it is relatively easy to clean. The particles of cream returned to the reservoir 18 are carried with the liquid nitrogen under the dam 20 onto the flowing liquid nitrogen in the trough 22.

Substantially, all the cream is formed into spheroidal bodies. Typically, at least 25% and generally at least 50% of the bodies of cream that are formed have a diameter along their major axis of at least twice the diameter of the outlets 96 of the nozzles 12. We have found it possible to collect a frozen cream product including at least 85% by weight of such relatively large bodies. We have also found it possible to collect a frozen cream product including at last 90% by weight of bodies having a diameter (or length) along the major axis of at least three times the diameter of the nozzle.

The frozen bodies of cream that are collected may typically be packaged (e.g. in suitable plastic bags, or containers) and stored in a freezer ready for use. We have found that on allowing the frozen cream to thaw, there is not substantial deterioration and, in particular, when using it in hot drinks, there is no separation of fat from the cream.

The term "generally spherical or generally spheroid bodies" is used herein to mean bodies that include a curved surface or curved edge. As well as regular spheres and spheroids, disc shapes and egg-shapes are included. Moreover, the bodies need not be of a geometrically regular shape. Typically, we find that the bodies produced are irregular spheroids, the curvature of the bodies being less pronounced than in a regular spheroid.

The method according to the present invention is further illustrated by the following example.

EXAMPLE

An apparatus substantially as shown in FIGS. 2 to 7 was used to produce frozen bodies of double cream.

The apparatus employed four nozzles 12 each associated with its own channel 24. The channels 24 were each 1 m 70 cm in length and were downwardly inclined, the slope being 1 in 35. Each nozzle 12 had an outlet with an internal diameter of 2 mm.

The apparatus was first cooled down by initiating a flow of liquid nitrogen therethrough. The buckets 70 and drums 28 and 38 were rotated at 7 revolutions per minute. When the apparatus had been cooled, the nozzles were lowered into a dispensing position just above the liquid nitrogen level in the channels (about 0.5 mm above), the axes of the nozzles 12 making an angle of approximately 25° with the trough 22. Pasteurised double cream was fed to the nozzle 12 by a Watson-Marlow 301 four roller peristaltic pump. The pump was operated at 1416 revolutions per minute and four continuous pulsating streams of cream were produced. Thus, each stream was produced with 354 pulses per minute. The tubing employed in association with the peristaltic pump was of silicone rubber having an internal diameter of 4.8 mm and a wall thickness of 1.6 mm.

Cream was dispensed from each nozzle in a continuous, pulsating stream at a rate of 190 cm$^3$ per minute. The velocity of liquid nitrogen flow along each channel was 0.4 meters per second. The depth of the liquid nitrogen in each channel was 7 mm in normal operation (i.e., with cream being dispensed at the aforementioned rate).

Frozen "generally spheroid" bodies of cream were collected.

An estimate was made of the size distribution of the bodies. According to this estimate, about 95% by weight of the bodies of cream were from 7 to 9 mm long; about 3% in weight from 5 to 7 mm long, about 1% by weight from 1 to 5 mm long, and less than 1% were less than 1 mm long. The length referred to was the length along the longest dimension of each body.

It is not necessary to employ the fan 53 to create a flow of nitrogen vapour along the interior of the drums 28 and 38. Such flow will tend to take place, the nitrogen vapour being exhausted through the outlet 51, even if the fan 53 is omitted. If desired, however, as fan may be employed to extract nitrogen vapour from the vicinity of the tray 50 in the interior of the housing.

It will be understood that the foregoing and other various changes in form and details may be made without parting from the spirit and scope of the present invention. Consequently, it is intended that the appended claims be interpreted as including all such changes and modifications.

We claim:

1. A process for freezing a liquid to form generally spherical, discrete frozen bodies of the liquid comprising the steps of:
   discharging a pulsating and substantially continuous flow of the liquid through at least one orifice;
   flowing a stream of liquefied gas having a boiling point below −30° C. along a channel;
   contacting said discharged liquid flow with said stream of liquefied gas in said channel for a time period sufficient to freeze at least the peripheries of said bodies which then flow with said stream of liquefied gas along said channel;
   controlling the rate at which said liquid is discharged from said orifice such that a substantial portion of said discrete frozen bodies exhibit a cross-sectional area greater than the diameter of said orifice; and
   collecting said discrete, frozen bodies.

2. The process as defined in claim 1 wherein said liquefied gas is liquid nitrogen.

3. The process as defined in claim 1 additionally comprising the step of rolling at least some of said discrete, frozen bodies along said channel with said flowing stream of liquefied gas.

4. The process as defined in claim 1 wherein the step of contacting said discharged liquid flow with said stream of liquefied gas comprises freezing only the peripheries of the larger of said discrete bodies.

5. The process as defined in claim 4 additionally comprising the steps of separating said discrete bodies having only the peripheries thereof frozen from said stream of liquefied gas and contacting said separated discrete bodies with the vapor phase of said liquefied gas to substantially completely freeze said discrete bodies.

6. The process as defined in claim 1 additionally comprising the steps of separating said discrete frozen bodies from said stream of liquefied gas; collecting said separated liquefied gas in a sump; supplying said liquefied gas from said sump into said channel to form said stream of liquefied gas.

7. The process as defined in claim 6 wherein the step of supplying said liquefied gas into said channel comprises the steps of transferring said liquefied gas from said sump into a reservoir disposed in the vicinity of one end of said channel and passing said liquefied gas from said reservoir into said channel to form said stream of liquefied gas.

8. The process defined in claim 1 wherein at least 90% of the liquid to be frozen is collected in the form of said discrete, frozen bodies having a major axis of at least three times the diameter of the orifice.

9. The process as defined in claim 1 wherein said liquid is cream.

10. The process as defined in claim 1 additionally comprising the step of providing a plurality of said orifices and a plurality of said channels with each of said orifices being disposed so as to discharge a flow of said liquid into a corresponding one of said channels and wherein the depth of the stream of liquefied gas in each of said channels is in the range of 0.5 to 1.5 times the maximum diameter of said discrete, frozen bodies.

11. The process as defined in claim 1 wherein the step of contacting said liquid flow with said stream of liquefied gas comprises maintaining said flow and said stream in direct contact with one another in said channel for between about 4 and 15 seconds.

12. The process as defined in claim 1 wherein said liquid is discharged through said orifice at a rate of at least 150 cubic centimeters per minute.

13. Apparatus for freezing a liquid to form generally spherical, discrete, frozen bodies of the liquid comprising fluid containing channel means sloping generally downwardly; orifice means for discharging said liquid into said channel means; means for supplying a pulsating and substantially continuous flow of said liquid to said orifice means for discharge into said channel means; means for introducing a stream of liquefied gas having a boiling point of −30° C. or less into the upper end of said channel means such that upon contact between said stream and said liquid flow, discrete, frozen bodies of said liquid having at least the peripheries thereof frozen are formed in said channel means; means for separating said discrete, frozen bodies from said stream of liquefied gas and means for collecting said discrete, frozen bodies.

14. The apparatus defined in claim 13 wherein said orifice means comprises one or more nozzles and said channel means comprises one or more channels.

15. The apparatus defined in claim 13 wherein said means to supply said liquid flow to said orifice means comprises a positive displacement pump.

16. The apparatus defined in claim 15 wherein said positive displacement pump is a peristaltic pump device.

17. The apparatus defined in claim 13 wherein the outlet end of said channel is disposed in the vicinity of and above the inlet of said separator means.

18. The apparatus defined in claim 17 wherein said separator means comprises a rotary drum having perforations therein and a sump disposed below said drum and adapted to receive said stream of liquefied gas flowing through said perforations while said discrete, frozen bodies remain in said rotary drum.

19. The apparatus defined in claim 18 wherein said collecting means are adapted to receive said discrete, frozen bodies from an outlet of said rotary drum and additionally comprising means for returning said liquefied gas from said sump to a reservoir which is adapted to pass said liquefied gas to the inlet of said channel.

20. The apparatus defined in claim 19 wherein said means for returning said liquefied gas to said reservoir comprise a plurality of radially disposed buckets; means for translating said buckets around a circumferential path such that each of said buckets scoops up liquefied gas from said sump and deposits said liquefied gas in said reservoir.

* * * * *